(12) United States Patent
Qiu

(10) Patent No.: US 10,313,499 B2
(45) Date of Patent: Jun. 4, 2019

(54) CARD TRAY WITHDRAWING APPARATUS AND COMMUNICATION DEVICE

(71) Applicant: ZTE CORPORATION, Shenzhen, Guangdong Province (CN)

(72) Inventor: Guorun Qiu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/762,565

(22) PCT Filed: Apr. 26, 2016

(86) PCT No.: PCT/CN2016/080275
§ 371 (c)(1),
(2) Date: Mar. 23, 2018

(87) PCT Pub. No.: WO2016/180231
PCT Pub. Date: Nov. 17, 2016

(65) Prior Publication Data
US 2018/0262600 A1 Sep. 13, 2018

(30) Foreign Application Priority Data
Sep. 25, 2015 (CN) .................... 2015 2 0755168 U

(51) Int. Cl.
H04M 1/02 (2006.01)
H04B 1/3818 (2015.01)

(52) U.S. Cl.
CPC .......... *H04M 1/026* (2013.01); *H04B 1/3818* (2015.01)

(58) Field of Classification Search
CPC ............................ H04M 1/026; H04M 1/02
See application file for complete search history.

(56) References Cited

U.S. PATENT DOCUMENTS 6,390,836 B1    5/2002  Motegi et al.
6,619,971 B1 *  9/2003  Chen ................... G06K 7/0047
                                                         439/159
8,337,223 B2   12/2012  Gao et al.

FOREIGN PATENT DOCUMENTS

| CN | 103248732 A |   | 8/2013  |              |
| CN | 104158927   | * | 11/2014 | ............ H01R 13/46 |
| CN | 104158927 A |   | 11/2014 |              |
| CN | 104518815 A |   | 4/2015  |              |
| CN | 205029706 U |   | 2/2016  |              |

* cited by examiner

Primary Examiner — Tuan H Nguyen
(74) Attorney, Agent, or Firm — Ling Wu; Stephen Yang; Ling and Yang Intellectual Property

(57) ABSTRACT

A card tray withdrawing apparatus and communication device are provided. Herein, the card tray withdrawing apparatus includes a first interference part arranged at a first position in a housing, a second interference part arranged at a second position in the housing, and a button mounted on the housing, capable of moving from an initial position to the first position and capable of moving from the first position to the second position. The button moving to the first position interferes with the first interference part, and the first interference part turns on a circuit in the housing; and the button moving to the second position interferes with the second interference part, and the second interference part drives a card tray to be separated from a card slot. Herein, the communication device includes a housing, and further includes the card tray withdrawing apparatus.

8 Claims, 2 Drawing Sheets

CARD TRAY WITHDRAWING APPARATUS AND COMMUNICATION DEVICE

TECHNICAL FIELD

The present disclosure relates to, but not limited to, a mobile phone manufacturing technology, and particularly to a card tray withdrawing apparatus and communication device.

BACKGROUND

Nowadays, along with development of the mobile communication technology, there are more and more mobile phones adopting an integrated design. Since a rear cover cannot be opened and closed, a Subscriber Identity Module (SIM) card and a storage card can be installed and withdrawn from an installation hole in a lateral surface of a housing only. Such an installing manner is implemented by two approaches. First, a pressed pop-up card slot is used, and then the card slot in the housing is covered by virtue of a strip at a pop-up portion of the card slot. Second, a manner of combining a card tray and the card slot is adopted, and the SIM card is installed in the card tray at first, then the card tray is loaded in the card slot, and when the card is withdrawn, the card tray is required to be withdrawn by virtue of a poking pin.

For the first manner, there may usually be the phenomenon that a material of the strip is inconsistent with a material of a phone body; and a clasping position convenient for a finger to operate is also required to be reserved, so an attractive appearance of the phone body is greatly influenced. Moreover, the strip is easily detached during usage. This manner has substantially been deprecated, except for waterproof mobile phones.

For the second manner, the card slot can be withdrawn only with the poking pin, and a user may usually not carry about any poking pin, and is required to look for a poking pin or another substitute when the card is required to be withdrawn, so the manner is relatively inconvenient to use. Moreover, a pinhole is required to be reserved, so the attractive appearance of the phone body is also influenced.

SUMMARY

The below is a summary about a subject described in detail in the present disclosure. The summary is not intended to limit the scope of protection of the claims.

Embodiments of the present disclosure provide a card tray withdrawing apparatus and communication device, which can conveniently withdraw a card tray without influencing an attractive appearance of a housing of a mobile terminal.

An embodiment of the present disclosure provides a card tray withdrawing apparatus. The card tray withdrawing apparatus is arranged to turn on a circuit in a housing and separate a card tray accommodated in the housing from a card slot, and includes: a first interference part arranged at a first position in the housing, a second interference part arranged at a second position in the housing, and a button mounted on the housing, capable of moving from an initial position to the first position and capable of moving from the first position to the second position. The button moving to the first position interferes with the first interference part, and the first interference part turns on the circuit in the housing; and the button moving to the second position interferes with the second interference part, and the second interference part drives the card tray to be separated from the card slot.

In an exemplary embodiment, the first interference part includes a first metal arc dome, and the first metal arc dome includes a bottom and an arc top protruding outwards from the bottom. A first wire of the circuit is connected to the top, and a second wire of the circuit is connected to the bottom, and the button moving to the first position presses the top to contact with the bottom to turn on the circuit.

In an exemplary embodiment, the second interference part includes a moving part movably mounted at the second position in the housing, and there is a guide rod extending outwards connected to the moving part in the moving part. The card tray withdrawing apparatus further includes a lever arranged in the housing in a rotating manner, and one end of the lever is arranged to fit with an outer end of the guide rod, and the other end of the lever is arranged to fit with an edge of the card tray. The button moving to the second position interferes with the moving part, and the moving part drives the guide rod to move, and the moving guide rod presses the lever to rotate to enable the other end of the lever to pop up the card tray from the card slot.

In an exemplary embodiment, the card tray withdrawing apparatus further includes a mounting groove arranged in the housing. The moving part is arranged in the mounting groove in a sliding manner, and the first metal arc dome and the button are both arranged outside the mounting groove. An elastic part is arranged on a bottom wall of the mounting groove, and the button moving to the second position interferes with the moving part to move the moving part towards the bottom wall of the mounting groove, and then the elastic part applies an elastic force to the moving part to rebound the moving part to the second position.

In an exemplary embodiment, the elastic part includes a second metal arc dome, and a bottom of the second metal arc dome is arranged on the bottom wall of the mounting groove, and a top of the second metal arc dome protrudes towards the moving part at the second position.

An embodiment of the present disclosure further provides a communication device, which includes a housing and further includes the card tray withdrawing apparatus of the embodiments of the present disclosure.

The technical solutions of embodiments of the present disclosure can implement turning-on of the circuit in the housing, and may also separate the card tray accommodated in the housing from the card slot, and then a power button of a communication device may be integrated with a card tray opening button, so that the card tray can be withdrawn without a poking pin, and integrity of appearance of the whole machine is ensured.

After the drawings and the detailed descriptions are read and understood, the other aspects may be comprehended.

DETAILED DESCRIPTION

Figure 1:
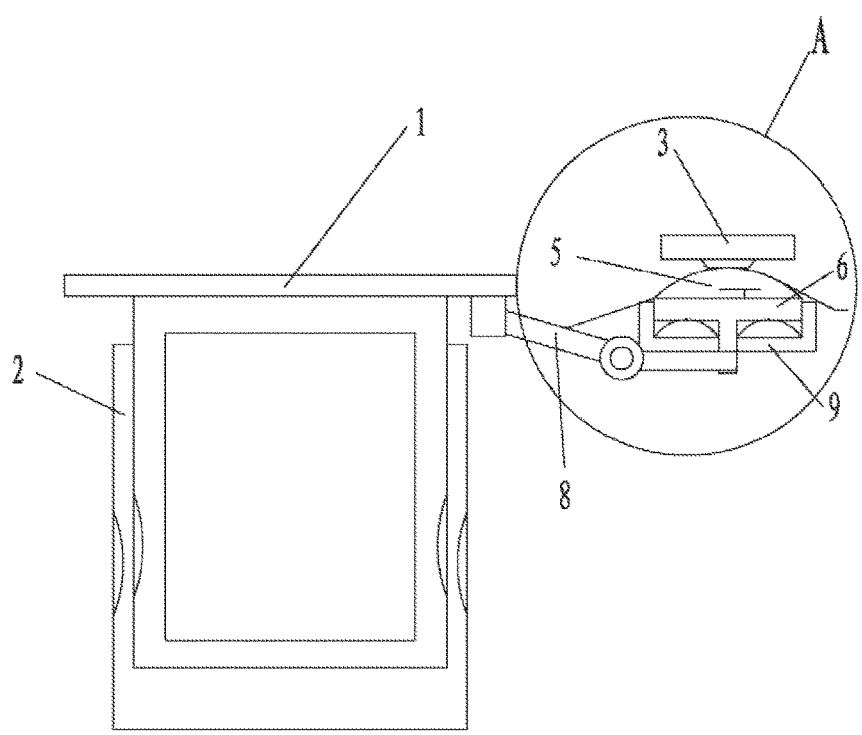
FIG. 1 is a structure diagram of a card tray withdrawing apparatus according to an embodiment of the present disclosure.
Figure 2:
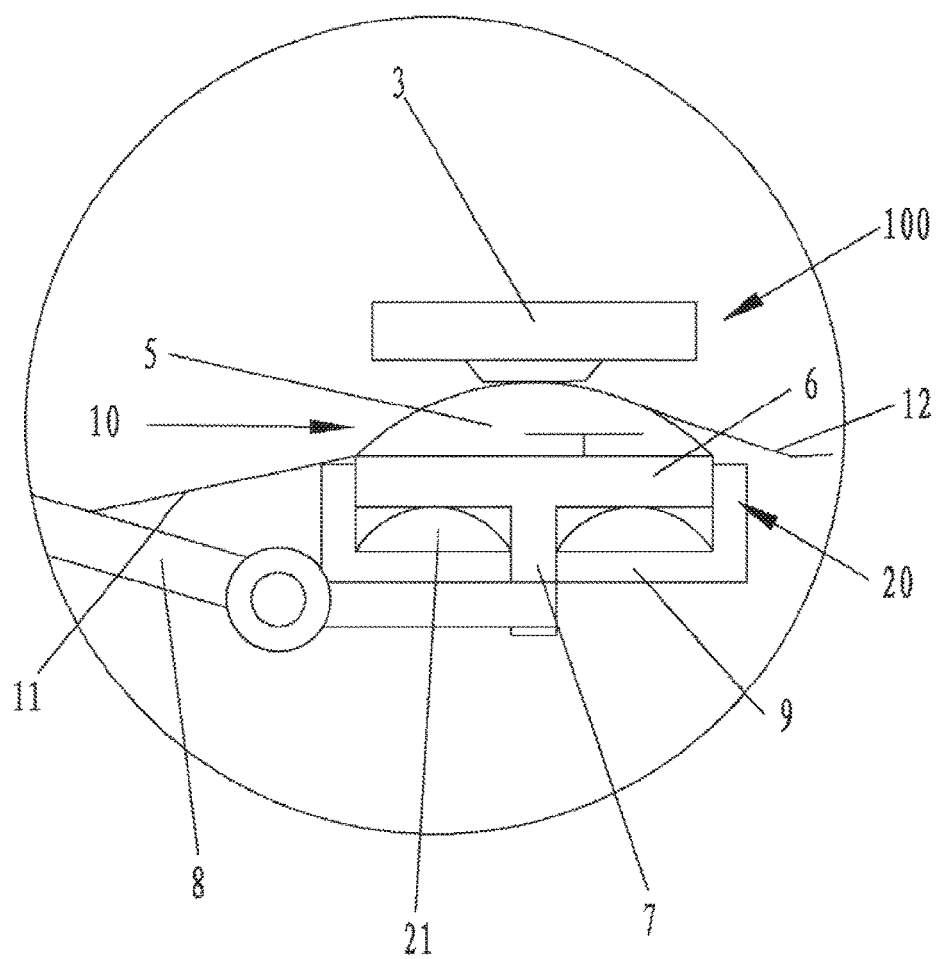
FIG. 2 is a partial enlarged drawing of A in FIG. 1.

As shown in FIG. 1 and FIG. 2, a card tray withdrawing apparatus of embodiments of the present disclosure is arranged to turn on a circuit in a housing and separate a card tray 1 accommodated in the housing from a card slot 2. The card tray withdrawing apparatus includes: a first interference part arranged at a first position 10 in the housing, a second interference part arranged at a second position 20 in the housing, and a button 3 mounted on the housing, capable of moving from an initial position 100 to the first position 10 and capable of moving from the first position 10 to the second position 20. The button 3 moving to the first position 10 interferes with the first interference part, and the first interference part turns on the circuit in the housing. The button 3 moving to the second position 20 interferes with the second interference part, and the second interference part drives the card tray 1 to be separated from the card slot 2.

In an exemplary embodiment, the first interference part includes a first metal arc dome 5. The first metal arc dome 5 includes a bottom and an arc top protruding outwards from the bottom. A first wire 12 of the circuit in the housing is connected to the top of the first metal arc dome 5, and a second wire 11 of the circuit is connected to the bottom of the first metal arc dome 5, and the button 3 moving to the first position 10 presses the top to contact with the bottom to turn on the circuit in the housing.

In an exemplary embodiment, the second interference part includes a moving part 6 movably mounted at the second position 20 in the housing. There is a guide rod 7 extending outwards connected to the moving part 6 in the moving part 6. The card tray withdrawing apparatus further includes a lever 8 arranged in the housing in a rotating manner. Herein, one end of the lever 8 is arranged to fit with an outer end of the guide rod 7, and the other end of the lever 8 is arranged to fit with an edge of the card tray 1. The button 3 moving to the second position 20 interferes with the moving part 6, and the moving part 6 drives the guide rod 7 to move, and the moving guide rod 7 presses the lever 8 to rotate to enable the other end of the lever 8 to pop up the card tray 1 from the card slot 2.

In an exemplary embodiment, the card tray withdrawing apparatus further includes a mounting groove 9 arranged in the housing. The moving part 6 is arranged in the mounting groove 9 in a sliding manner, and the first metal arc dome 5 and the button 3 are both arranged outside the mounting groove 9. An elastic part is arranged on a bottom wall of the mounting groove 9, and the button 3 moving to the second position 20 interferes with the moving part 6 to move the moving part 6 towards the bottom wall of the mounting groove 9, and then the elastic part applies an elastic force to the moving part 6 to rebound the moving part 6 to the second position 20.

In an exemplary embodiment, the elastic part includes a second metal arc dome 21. A bottom of the second metal arc dome 21 is arranged on the bottom wall of the mounting groove 9, and a top of the second metal arc dome 21 protrudes towards the moving part 6 at the second position.

A communication device of an embodiment of the present disclosure includes a housing and further includes the card tray withdrawing apparatus of the present disclosure.

The card tray withdrawing apparatus of embodiments of the present disclosure is a two-stage pressure button apparatus, and may realize a function of withdrawing the card tray by forcibly pressing the button.

A feed point is arranged on the card slot 2 to be connected with a main board, and the card slot 2 and the card tray 1 cooperate to fix a SIM card or a Trans-Flash (TF) card. The card tray withdrawing apparatus of embodiments of the present disclosure is a two-stage pressure mechanism, and may distinguish two pressing intensities, namely distinguishing slight pressing and heavy pressing. The circuit may be turned on in case of slight pressing. The card tray may be popped up by the lever in case of heavy pressing.

In case of slight pressing, the button 3 moves from the initial position 100 to the first position 10, and the button 3 moving to the first position 10 presses the top of the first metal arc dome 5 to contact with the bottom, and the first metal arc dome 5 is deformed to implement a connection of the first wire 12 and the second wire 11, namely implementing a turning-on function of an ordinary button.

At this moment, the button 3 is released, and the top of the first metal arc dome 5 is bounced again, and the button 3 is lifted to realize a circuit breaking function of the ordinary button.

In case of heavy pressing, besides turning-on of the circuit, the button 3 may also move to the second position 20, and the button 3 moving to the second position 20 interferes with the moving part 6, and the moving part 6 drives the guide rod 7 to move, and the moving guide rod 7 presses the lever 8 to rotate to enable the other end of the lever 8 to pop up the card tray 1 from the card slot 2. That is, the card tray 1 may finally be freed from a constraint of a locking instrument of the card slot 2 to be popped up. At this moment, the card tray 1 may be directly withdrawn with a hand. Then, the button 3 is released, and the second metal arc dome 21 lifts the moving part 6 together with the guide rod 7 to return the moving part 6 to its initial position.

When the card tray 1 is re-inserted, the card tray 1 presses down the other end of the lever 8, and one end of the lever 8 may contact with the guide rod 7 again.

The card tray withdrawing apparatus of embodiments of the present disclosure can implement turning-on of the circuit in the housing, and can also separate the card tray 1 accommodated in the housing from the card slot 2, and then a power button of a communication device can be integrated with a card tray opening button, so that the card tray can be withdrawn without a poking pin, and integrity of appearance of the whole machine is ensured.

The above are only the alternative implementation modes of the present disclosure. It should be pointed out that those skilled in the art may further make a plurality of improvements and embellishments without departing from the principle of the present disclosure and these improvements and embellishments shall also fall within the scope of protection of the present disclosure.

INDUSTRIAL APPLICABILITY

By the technical solutions, the card tray can be conveniently withdrawn without influencing an attractive appearance of a housing of a mobile terminal.

What I claim is:

1. A card tray withdrawing apparatus, arranged to turn on a circuit in a housing and separate a card tray accommodated in the housing from a card slot and comprising: a first interference part arranged at a first position in the housing, a second interference part arranged at a second position in the housing, and a button mounted on the housing, capable of moving from an initial position to the first position and capable of moving from the first position to the second position, wherein the button moving to the first position interferes with the first interference part, and the first interference part turns on the circuit in the housing; and the button moving to the second position interferes with the second interference part, and the second interference part drives the card tray to be separated from the card slot;

wherein the first interference part comprises a first metal arc dome, the first metal arc dome comprises a bottom and an arc top protruding outwards from the bottom, a first wire of the circuit is connected to the top, a second wire of the circuit is connected to the bottom, and the button moving to the first position presses the top to contact with the bottom.

2. The card tray withdrawing apparatus according to claim 1, wherein the second interference part comprises a moving part movably mounted at the second position in the housing, there is a guide rod extending outwards connected to the moving part in the moving part, and the card tray withdrawing apparatus further comprises a lever arranged in the housing in a rotating manner, one end of the lever is arranged to fit with an outer end of the guide rod, the other end of the lever is arranged to fit with an edge of the card tray, the button moving to the second position interferes with the moving part, the moving part drives the guide rod to move, and the moving guide rod presses the lever to rotate to enable the other end of the lever to pop up the card tray from the card slot.

3. The card tray withdrawing apparatus according to claim 2, further comprising a mounting groove arranged in the housing, wherein the moving part is arranged in the mounting groove in a sliding manner, the first metal arc dome and the button are both arranged outside the mounting groove, an elastic part is arranged on a bottom wall of the mounting groove, and the button moving to the second position interferes with the moving part to move the moving part towards the bottom wall of the mounting groove, and then the elastic part applies an elastic force to the moving part to rebound the moving part to the second position.

4. The card tray withdrawing apparatus according to claim 3, wherein the elastic part comprises a second metal arc dome, a bottom of the second metal arc dome is arranged on the bottom wall of the mounting groove, and a top of the second metal arc dome protrudes towards the moving part at the second position.

5. A communication device, comprising a housing and further comprising the card tray withdrawing apparatus according to claim 4.

6. A communication device, comprising a housing and further comprising the card tray withdrawing apparatus according to claim 3.

7. A communication device, comprising a housing and further comprising the card tray withdrawing apparatus according to claim 2.

8. A communication device, comprising a housing and further comprising the card tray withdrawing apparatus according to claim 1.

* * * * *